US011917459B2

(12) United States Patent
Park et al.

(10) Patent No.: US 11,917,459 B2
(45) Date of Patent: *Feb. 27, 2024

(54) METHOD AND APPARATUS FOR SUPPORTING DATA SYNCHRONIZATION FOR 4G/5G DUAL-REGISTERED MOBILE COMMUNICATION TERMINAL

(71) Applicant: SAMSUNG ELECTRONICS CO., LTD., Suwon-si (KR)

(72) Inventors: Jungshin Park, Seoul (KR); Sangjun Moon, Seoul (KR); Kisuk Kweon, Suwon-si (KR); Jicheol Lee, Suwon-si (KR); Jinsung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,066

(22) Filed: Jan. 9, 2023

(65) Prior Publication Data

US 2023/0164638 A1 May 25, 2023

Related U.S. Application Data

(63) Continuation of application No. 16/103,799, filed on Aug. 14, 2018, now Pat. No. 11,553,379.

(30) Foreign Application Priority Data

Aug. 14, 2017 (KR) .................. 10-2017-0102950

(51) Int. Cl.
*H04W 36/00* (2009.01)
*H04L 41/08* (2022.01)
(Continued)

(52) U.S. Cl.
CPC ......... *H04W 36/0005* (2013.01); *H04L 41/08* (2013.01); *H04W 36/023* (2013.01); *H04W 36/14* (2013.01); *H04W 88/08* (2013.01)

(58) Field of Classification Search
None
See application file for complete search history.

(56) References Cited

U.S. PATENT DOCUMENTS 11,051,224 B2  6/2021  Jin et al.
2009/0046660 A1  2/2009  Casati et al.
(Continued)

FOREIGN PATENT DOCUMENTS

JP  201722679 A  1/2017

OTHER PUBLICATIONS

ISA/KR, "International Search Report," International Application No. PCT/KR2018/009341, dated Nov. 22, 2018, 4 pages.
(Continued)

*Primary Examiner* — Chirag G Shah
*Assistant Examiner* — Suk Jin Kang (57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The embodiments in the present disclosure allow to transfer remaining data between different base stations in a dual-registration interworking process, which provides terminal mobility between 4G and 5G networks without a data loss. Further, it provides the terminal mobility with no data loss without changing 5G and 4G base station implementation through addition of a simple function of new equipment, such as SMF and UPF. Further, it supports different QoS and forwarding path units in the 5G/4G networks without changing 5G and 4G base station functions. Further, it exempts
(Continued)

additional function implementation costs for re-ordering in a terminal and a network through in-order delivery of packets to the terminal without changing the packet order during 4G-5G network movement.

6 Claims, 7 Drawing Sheets

(51) Int. Cl.
*H04W 36/02* (2009.01)
*H04W 36/14* (2009.01)
*H04W 88/08* (2009.01)

(56) References Cited

U.S. PATENT DOCUMENTS

| | | |
|---|---|---|
| 2009/0046662 A1 | 2/2009 | Casati et al. |
| 2010/0067489 A1 | 3/2010 | Pelletier et al. |
| 2011/0090866 A1 | 4/2011 | Yang |
| 2013/0072194 A1 | 3/2013 | Tooyama et al. |
| 2016/0302064 A1 | 10/2016 | Tsai et al. |
| 2016/0302119 A1 | 10/2016 | Chen et al. |
| 2017/0019824 A1 | 1/2017 | Ishihara et al. |
| 2017/0034749 A1 | 2/2017 | Chandramouli et al. |
| 2018/0132141 A1 | 5/2018 | Huang-Fu et al. |
| 2018/0199302 A1 | 7/2018 | Yi et al. |
| 2018/0288657 A1 | 10/2018 | Stojanovski et al. |
| 2018/0352483 A1 | 12/2018 | Youn et al. |
| 2018/0376384 A1 | 12/2018 | Youn et al. |
| 2019/0037417 A1 | 1/2019 | Lei et al. |
| 2019/0053115 A1 | 2/2019 | Ngai et al. |
| 2019/0090165 A1 | 3/2019 | Huang-Fu et al. |
| 2019/0150219 A1 | 5/2019 | Wang et al. |
| 2019/0174363 A1 | 6/2019 | Tsuda et al. |
| 2019/0182732 A1 | 6/2019 | Wei et al. |
| 2019/0182737 A1 | 6/2019 | Futaki et al. |
| 2019/0190665 A1 | 6/2019 | Koskinen |
| 2019/0191348 A1 | 6/2019 | Futaki et al. |
| 2019/0200174 A1 | 6/2019 | Shaw et al. |
| 2019/0253944 A1 | 8/2019 | Kim |
| 2019/0297541 A1 | 9/2019 | Chandramouli et al. |
| 2019/0306728 A1 | 10/2019 | Lei et al. |
| 2019/0313473 A1 | 10/2019 | Kim et al. |
| 2019/0320356 A1 | 10/2019 | Shaw et al. |
| 2019/0327658 A1 | 10/2019 | Han |
| 2019/0335365 A1 | 10/2019 | Ying et al. |
| 2019/0364463 A1 | 11/2019 | Youn et al. |
| 2020/0008255 A1 | 1/2020 | Sharma et al. |
| 2020/0015128 A1 | 1/2020 | Stojanovski et al. |
| 2020/0015130 A1 | 1/2020 | Wang |
| 2020/0015294 A1 | 1/2020 | Xin et al. |
| 2020/0022031 A1 | 1/2020 | Li et al. |
| 2020/0053562 A1 | 2/2020 | Kim et al. |
| 2020/0068445 A1 | 2/2020 | Wu et al. |
| 2020/0068449 A1 | 2/2020 | Jin et al. |
| 2020/0068481 A1 | 2/2020 | Kim et al. |
| 2020/0077315 A1 | 3/2020 | Jin et al. |
| 2020/0077317 A1 | 3/2020 | Sharma et al. |
| 2020/0084675 A1* | 3/2020 | Lu ................ H04W 80/10 |
| 2020/0092710 A1 | 3/2020 | Kim et al. |
| 2020/0092758 A1 | 3/2020 | Youn et al. |
| 2020/0092780 A1 | 3/2020 | Koshimizu et al. |
| 2020/0100147 A1 | 3/2020 | Youn et al. |
| 2020/0112522 A1 | 4/2020 | Dannebro et al. |
| 2020/0112894 A1* | 4/2020 | Koshimizu ...... H04W 36/0022 |
| 2020/0128452 A1 | 4/2020 | Centonza et al. |
| 2020/0154388 A1 | 5/2020 | Koshimizu et al. |
| 2020/0162962 A1 | 5/2020 | Li et al. |
| 2020/0178138 A1 | 6/2020 | Han et al. |
| 2020/0213819 A1 | 7/2020 | Kim |
| 2020/0374948 A1 | 11/2020 | Pan et al. |
| 2020/0383151 A1 | 12/2020 | Wang |
| 2021/0360501 A1 | 11/2021 | Jin et al. |

OTHER PUBLICATIONS

CATT, "TS 23.502: Indirect data forwarding for 5GS to EPS handover," S2-174585 (revision of S2-17xxxx), SA WG2 Temporary Document, SA WG2 Meeting #122, San Jose Del Cabo, Mexico, Jun. 26-30, 2017, 7 pages.

ETRI, "TS 23.502: adding buffered DL data forwarding to UE triggered Service Request in CM-IDLE state," S2-174421, SA WG2 Temporary Document, SA WG2 Meeting #122, San Jose Del Cabo, Mexico, Jun. 26-30, 2017, 8 pages.

Samsung, et al., "5GC-EPC Interworking for a dual-registration UE," S2-174688, SA WG2 Temporary Document, SA WG2 Meeting #122, San Jose Del Cabo, Mexico, Jun. 26-30, 2017, 4 pages.

Samsung, et al., "Interworking procedure for a dual-registration UE: EPC to 5GC mobility," S2-174692, SA WG2 Temporary Document, SA WG2 Meeting #122, San Jose Del Cabo, Mexico, Jun. 26-30, 2017, 13 pages.

Ericsson, "PDU Session ID allocation in EPS", SA WG2 Meeting #122, Jun. 26-30, 2017, S2-174197, 6 pages.

Supplementary European Search Report dated Jun. 19, 2020 in connection with European Patent Application No. 18 84 5498, 11 pages.

Office Action dated Aug. 27, 2021 in connection with Chinese Patent Application No. 201880052530.7, 26 pages.

Supplementary European Search Report dated Sep. 12, 2023, in connection with European Patent Application No. 23180936.9, 10 pages.

\* cited by examiner

METHOD AND APPARATUS FOR SUPPORTING DATA SYNCHRONIZATION FOR 4G/5G DUAL-REGISTERED MOBILE COMMUNICATION TERMINAL

CROSS-REFERENCE TO RELATED APPLICATIONS

This application is a continuation of application Ser. No. 16/103,799 filed Aug. 14, 2018, now U.S. Pat. No. 11,553,379, issued Jan. 10, 2023, which is based on and claims priority under 35 U.S.C. § 119 to Korea Patent Application No. 10-2017-0102950 filed Aug. 14, 2017, in the Korea Intellectual Property Office, the disclosure of which is incorporated by reference herein in its entirety.

BACKGROUND

1. Field

The present disclosure relates to an apparatus for providing a service without a data loss in a process where a terminal moves between 5G and 4G mobile communication systems and an operation method thereof.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

On the other hand, in a general communication system, information for configuring a data forwarding path for data synchronization is transferred in an inter-eNB handover procedure. However, in case of dual-registration interworking, since terminal mobility is supported by a connection procedure between a terminal and a network without transferring an inter-eNB handover signal, it is difficult to apply a general communication technology thereto. Accordingly, there has been a need for schemes for solving this.

SUMMARY

Aspects of the present disclosure propose a data synchronization scheme for supporting terminal mobility between 4G and 5G networks without a packet loss through non-use of a handover signal procedure during application of dual-registration interworking. If a terminal moves between the 4G and 5G networks through application of the proposed scheme, it becomes possible to provide seamless services without a data loss.

In accordance with an aspect of the present disclosure, a method for controlling a first entity in a wireless communication system includes receiving a data forwarding request from a second entity through a movement of a terminal from a first network to a second network; configuring a data forwarding path between the first entity and a first network base station based on the received data forwarding request, and transmitting information on the configured data forwarding path to the first network base station; receiving data packets from the first network base station based on the configured data forwarding path; and forwarding the received data packets through a path established with respect to a second network base station.

In accordance with another aspect of the present disclosure, a method for controlling a first network base station in a wireless communication system includes receiving, if a first entity receives a data forwarding request from a second entity through a movement of a terminal from a first network to a second network, configuration information on a data forwarding path between the first entity and the first network base station from the first entity based on the received data forwarding request; establishing the data forwarding path based on the configuration information; and transmitting data packets that have not been transmitted to the terminal to the first entity through the established data forwarding path, wherein the data packets are forwarded by the first entity through a path established with respect to a second network base station.

In accordance with still another aspect of the present disclosure, a first entity in a wireless communication system is provided. The first entity is configured to receive a data forwarding request from a second entity through a movement of a terminal from a first network to a second network, configure a data forwarding path between the first entity and a first network base station based on the received data forwarding request and transmit information on the configured data forwarding path to the first network base station, receive data packets from the first network base station based on the configured data forwarding path, and forward the received data packets through a path established with respect to a second network base station.

In accordance with yet still another aspect of the present disclosure, a first network base station in a wireless communication system is provided. The first network base station is configured to receive, if a first entity receives a data forwarding request from a second entity through a movement of a terminal from a first network to a second network, configuration information on a data forwarding path between the first entity and the first network base station from the first entity based on the received data forwarding request, establish the data forwarding path based on the configuration information, and transmit data packets that have not been transmitted to the terminal to the first entity through the established data forwarding path, wherein the data packets are forwarded by the first entity through a path established with respect to a second network base station.

According to the aspects of the present disclosure, it is possible to transfer the remaining data between different base stations in the dual-registration interworking process, and thus it becomes possible to provide the terminal mobility between the 4G and 5G networks without the data loss.

Further, it becomes possible to provide the terminal mobility with no data loss without changing the 5G and 4G base station implementation through addition of a simple function of new equipment, such as a session management function (SMF) device and a user plane function (UPF) device.

Further, it becomes possible to support different QoS and forwarding path units in 5G and 4G networks without changing 5G and 4G base station functions.

Further, it becomes possible to exempt additional function implementation costs for re-ordering in the terminal and the network through in-order delivery of packets to the terminal without changing the packet order during 4G-5G network movement.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, in describing the present disclosure, related well-known functions or configurations incorporated herein are not described in detail in the case where it is determined that they obscure the subject matter of the present disclosure in unnecessary detail. Hereinafter, embodiments of the present disclosure will be described in detail with reference to the accompanying drawings.

In describing embodiments in the present description, explanation of the technical contents that are well-known in the technical fields to which the present disclosure pertains and are not directly related to the present disclosure will be omitted in the case where it is determined that they obscure the subject matter of the present disclosure in unnecessary detail.

For the same reason, in the accompanying drawings, some constituent elements are exaggerated, omitted, or roughly illustrated. Further, sizes of some constituent elements may not completely reflect the actual sizes thereof. In the drawings, the same drawing reference numerals are used for the same elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer-usable or computer-readable memory that can direct a computer or another programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

In a wireless communication technology, standardization for 5G communication standards is actively in progress, and it is expected that 5G services will start. For some time from an initial introduction, it is expected that a new 5G network for providing 5G services coexists with the existing established 4G network to provide services to mobile communication terminals, and in particular, in order to solve the service cutoff problem due to the limited service coverage in the initial stage of 5G introduction, it is essential to consider a function of providing seamless services in interworking with the 4G network. Further, in case of an ultra-high frequency band (mmW frequency band) being considered as a 5G communication band, it is suitable to broadband high-speed services, but is vulnerable to a path loss with a small cell radius. Accordingly, it is expected that the terminal mobility management is restricted, and thus there has been a demand for a 4G/5G interworking technology to supplement this using the 4G network.

If the terminal intends to change the network to be used through movement from a 5G service coverage to a 4G serviceable coverage or movement from the 4G service coverage to the 5G serviceable coverage, the overall operation and procedure of the terminal and 4G/5G networks to provide seamless services to the terminal may be called the 4G-5G interworking, and the 4G-5G interworking may be classified into two types: single-registration interworking and dual-registration interworking.

The terminal may mean user equipment (UE), mobile station, subscriber station, remote terminal, wireless terminal, or user device.

Figure 1A:
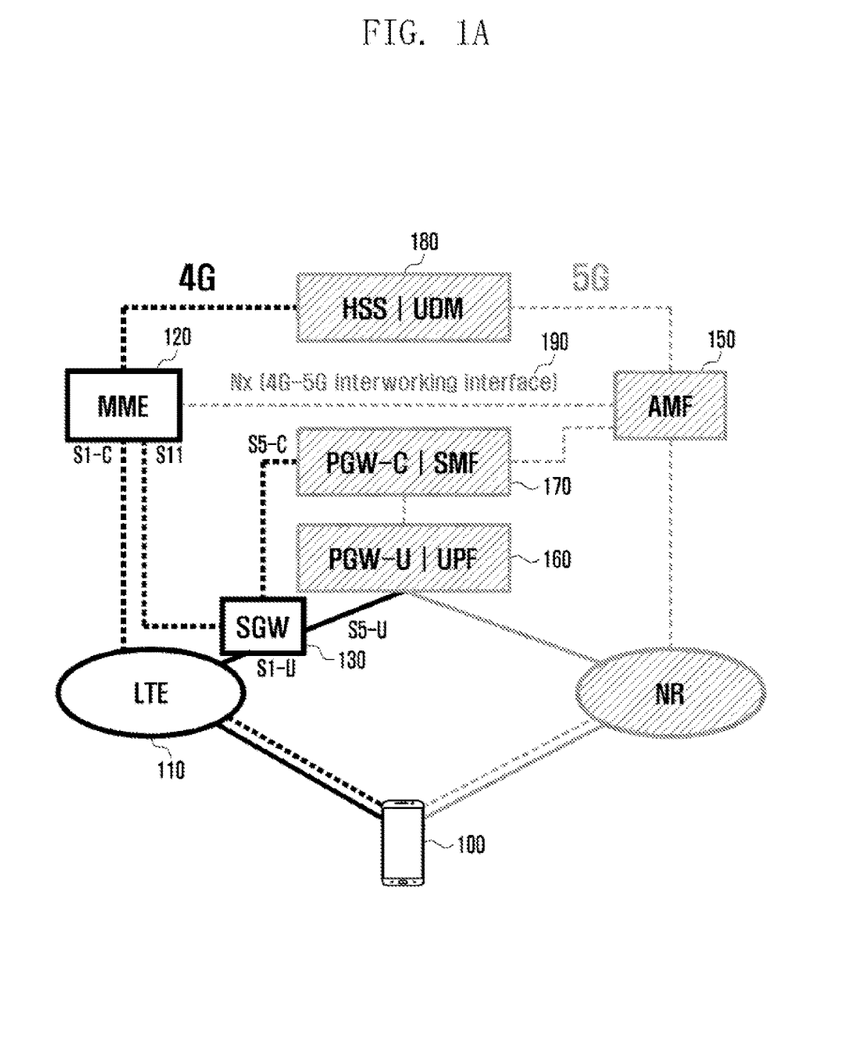
FIG. 1A is an exemplary diagram illustrating the 4G-5G interworking network structure based on single registration.

Referring to FIG. 1A, according to the single-registration interworking type, a terminal 100 may be connected to only one of 4G and 5G networks to perform communication at a certain moment. For example, the single-registration interworking type is a type in which, if the terminal moves between the service coverages of the 4G and 5G networks, terminal status information is transferred from the currently connected network to the network to move thereto, and thus the seamless services become possible. The single-registration interworking type requires a new interface 190 for the interworking operation between the 4G and 5G networks. On the other hand, referring to FIG. 1B, the dual-registration interworking is a type in which the terminal maintains a state where the terminal is connected to both the 4G and 5G networks, and if the terminal moves between the service coverages of the 4G and 5G networks, a data forwarding path is reconfigured to enable the terminal to use the seamless communication services. The dual-registration interworking type does not require to implement a new interface between the 4G and 5G networks.

The present disclosure relates to a data synchronization scheme between 4G and 5G base stations to prevent a packet loss that may occur during application of the dual-registration interworking. Hereinafter, explanation will be made around the dual-registration interworking related to the present disclosure.

According to an embodiment of the present disclosure, in the dual-registration interworking, the terminal may separately perform initial connection processes with the 4G and 5G networks, and the initial connection processes may be performed in a sequential or simultaneous manner.

Figure 1B:
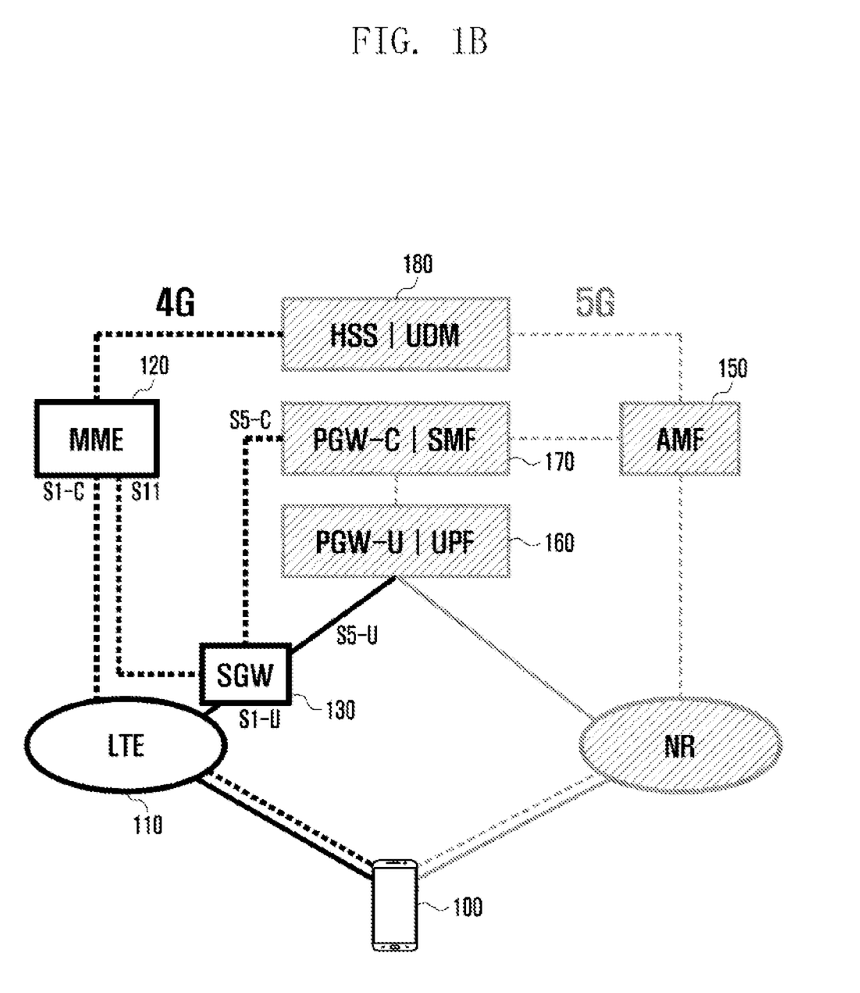
FIG. 1B is an exemplary diagram illustrating the 4G-5G interworking network structure based on dual registration.

On the other hand, as illustrated in FIGS. 1A and 1B, if the terminal 100 accesses the 4G network, it may camp on an LTE base station 110. A mobility management entity (MIME) 120 may manage mobile context of the terminal 100, session context, and security information. A serving gateway (SGW) 130 may provide a user plane function. The MME 120 and the SGW 130 may be in the same physical entity.

If the terminal 100 accesses the 5G network, it may camp on an NR base station 140. In the 5G network, an access & mobility management function (AMF) entity 150 may be included. The AMF entity 150 may have the same function as the function of the MME 120 of the 4G network as described above, or may perform at least a part of the function. For example, the AMF entity 150 may manage information related to access authorization of a core network of the terminal 100 and mobility of the terminal 100.

Further, for the 4G-5G interworking, the communication system may include a PGW-U+UPF entity 160 (or UPF+PGW-U entity), PGW-C+SMF entity 170 (or SMF+PGW-C entity), and HSS+UDM entity 180 (or UDM+HSS entity). For example, the PGW-U+UPF entity 160 may perform functions of a 4G network packet data network gateway-user plane (PGW-U) entity and a 5G network user plane function (UPF) entity. For example, the PGW-U+UPF entity 160 may perform a routing function so that data can be transmitted and received between the terminal 100 and a data network on a user plane, and may perform an anchor function for allocating an internet protocol (IP) address corresponding to the data network.

The PGW-C+SMF entity 170 may perform functions of a 4G network packet data network gateway-control plane (PGW-C) entity and a 5G network session management function (SMF) entity. For example, the PGW-C+SMF entity 170 may generate a session for data transmission between the terminal 100 and the data network through the PGW-U+UPF entity 160, and may control UPF relocation for changing the PGW-U+UPF entity 160 connected to the terminal 100.

The HSS+UDM entity 180 may perform functions of a home subscriber server (HSS) and a 5G network unified data management (UDM) entity. For example, the HSS+UDM entity 180 may manage subscriber information.

Figure 2:
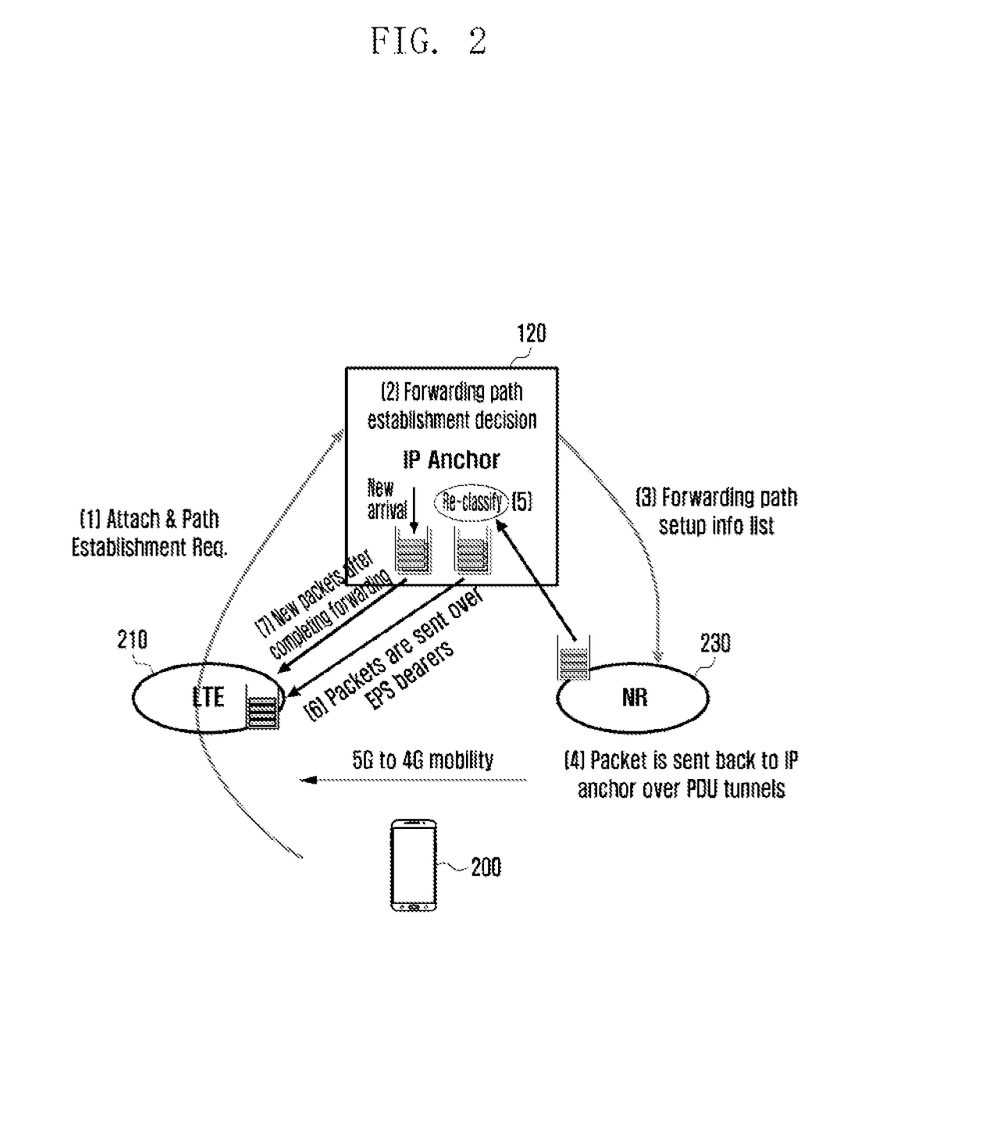
FIG. 2 is an exemplary diagram explaining the operational concept according to an embodiment of the present disclosure.

FIG. 2 is a diagram explaining a dual-registration interworking operation in case where a terminal 200 moves from a 5G network service coverage to a 4G network coverage. Even in case where a terminal 200 moves from a 4G network service coverage to a 5G network service coverage, a similar operation is performed, and for convenience in explanation, detailed explanation thereof will be omitted.

According to an embodiment of the present disclosure, as illustrated in FIG. 2, if a terminal 200, which is initially connected to a 5G network, secedes from the service coverage and moves to a 4G network coverage, it performs an initial connection with the 4G network (in case where a connection process was not previously performed), or it performs a PDN connectivity request procedure (in case where the connection process was previously performed). In the terminal connection or PDN connection configuration process, a mobility management entity (MME) of the 4G network acquires from HSS+UDM an address of PGW-C+SMF used in the 5G network to configure a data forwarding path to be used by the terminal 200, and using this, it proceeds with a process of configuring a default bearer to be used by the PGW-C+SMF and the terminal 200. Through such a process, it is possible to configure the same PGW-C+SMF and data path and to maintain the same IP address of the terminal 200 even if the terminal 200 moves between the 4G and 5G networks. If the default bearer of the terminal 200 is configured in the terminal connection process, the PGW-C+SMF switches the data forwarding path from a path in which data is transferred to the previous 5G base station to a path in which the data is transferred to a new 4G base station.

As described above, the dual-registration interworking is performed through an access (or session configuration) procedure to the network to which the terminal has newly moved (in this case, 4G network), and is featured so that an inter-eNB handover signal procedure is not performed. Accordingly, it is difficult to apply the data synchronization technology based on the existing inter-eNB handover signal procedure, and thus a new type of a synchronization method is necessary.

In general, a handover process between 4G base stations may include the following operations.
1) A source base station accessed by the terminal before the handover determines whether the handover is necessary.
2) In case where the handover is necessary, the source base station transfers to a target base station a signal message indicating that the handover of the corresponding terminal is necessary. In this process, the signal message transferred by the source base station includes a separate forwarding data path setup request information for transmitting data remaining in the source base station to the target base station. In this process, setup of a plurality of forwarding data paths in the unit of an EPS bearer is requested.
3) After receiving the handover request message from the source base station, the target base station determines whether to accept the handover and whether to accept the forwarding data path setup. In case of accepting the forwarding data path setup, a tunnel endpoint ID (TEID) of a tunnel for each bearer to which the data is to be transferred is included in a response message to be transferred to the source base station.
4) The source base station commands the terminal to start the handover, and transfers the remaining data to the target base station using the tunnels.

The above-described operation describes a general handover process between 4G base stations, and includes the contents in which path setup for data synchronization is performed through handover signaling. If the handover is performed in the 4G network, the tunnel configuration unit is maintained as the EPS bearer unit, and thus a process for packet reclassification is not required in the source base station. In this case, the data can be transferred to the target base station through each corresponding tunnel for each PDCP buffer previously stored.

In general, information for configuring the data forwarding path for the data synchronization is transferred through the inter-eNB handover procedure, whereas in the dual-registration interworking as described above, the terminal mobility is supported by a connection procedure between the terminal and the network without transferring the inter-eNB handover signal, and thus it is not possible to apply the related art. Further, since the 5G network and the 4G network have different units to configure the data forwarding paths, it is difficult to apply the tunneling method in the related art as it is. In the 4G network, the forwarding path (tunnel) is configured in the unit of a data radio bearer of a radio section, whereas in the 5G network, the forwarding path is configured in the unit of QoS flows corresponding to a set of IP flows having the same QoS. Accordingly, it is not possible to apply the existing method for configuring the forwarding path as it is.

Accordingly, the present disclosure proposes a data synchronization scheme for supporting the terminal mobility between the 4G and 5G networks without a packet loss through non-use of a handover signal procedure during application of the dual-registration interworking. If the terminal moves between the 4G and 5G networks through application of the scheme proposed in the present disclosure, it becomes possible to provide seamless services without a data loss.

Specifically, the present disclosure relates to the contents in which communication services are provided to a terminal that can perform dual access to the 4G and 5G through the 4G and 5G networks. The terminal separately accesses the 4G and 5G, and supports a dual-access function to the 4G and 5G networks. The 4G network is composed of an MME, SGW, and eNB, and PGW-C, PGW-U, and HSS have common functions to the 5G network. The 5G network is composed of an AMF and an NR base station, and SMF, UPF, and UDM have common functions to the 4G network. The PGW-C and SMF, the PGW-U and UPF, and the HSS and UDM are implemented to have one common function, respectively, and are commonly used for the 4G and 5G network operations.

As illustrated in FIG. 2, an embodiment of the present disclosure includes determining, by PGW-C+SMF, QoS flows for data synchronization in a dual-registration interworking process if a terminal moves between 4G and 5G network coverages, configuring a path for transferring remaining data packets between base stations, reclassifying and buffering, by PGW-U+UPF, the data packets transferred from the base station, and transferring the buffered packets to a new base station and releasing the forwarding path.

Further, for operations of new functions proposed by the present disclosure, new messages and parameters are defined as follows.

Forwarding path setup request/response message: This is used to configure a data forwarding path for data synchronization between SMF and NR base station or between SMF and 4G base station (eNB). The SMF transmits the request message. For example, the SMF may transmit the request message to the UPF.

: Forwarding path setup request (n-tuples of {QoS flow ID list, UPF TEID})

(During movement from 5G network to 4G network coverage)

QoS flow ID list: Information of QoS flows for transferring data through the same data forwarding path UPF TEID: UPF reception end information (tunnel endpoint ID) for transferring data from a base station to UPF :Forwarding path setup request (n-tuples of {EPS bearer ID, UPF TEID})

(During movement from 4G network to 5G network coverage)

EPS bearer ID: Bearer (4G QoS providing unit) information transferred through a data forwarding path UPF TEID: UPF reception end information (tunnel endpoint ID) for transferring data from a base station to UPF :Forwarding path setup response (list of accepted QoS flow IDs)

(During movement from 5G network to 4G network coverage)

List of accepted QoS flow IDs: List of QoS flows for which a data transfer request has been accepted by a 5G base station :Forwarding path setup response (list of accepted EPS bearer IDs)

(During a movement from 4G network to 5G network coverage)

List of accepted EPS bearer IDs: List of EPS bearers for which a data transfer request has been accepted by a 4G base station According to an embodiment of the present disclosure, through the movement from the 5G network to the 4G network as shown in FIG. 2, the terminal 200 may transmit an attach request to an LTE base station 210 of the 4G network. In this case, the LTE base station 210 may transmit an attach and path establishment request to an IP anchor 220. The IP anchor 220 may include PGW-U+UPF. For example, the LTE base station 210 may transmit the attach and path establishment request to the PGW-U+UPF via the MME and the PGW-C+SMF.

If the IP anchor 220 determines forwarding path establishment, the terminal 200 may transfer a forwarding path setup information list to an NR base station 230 of the 5G network pre-attached by the terminal 200. On the other hand, the NR base station 230 of the 5G network is merely exemplary, and may also be an enhanced LTE (eLTE).

The NR base station 230 having received the forwarding path setup information list may transmit packets, which have been received, but have not been transmitted to the terminal 200, to the IP anchor 220 through a PDU tunnel. The IP anchor 220 may reclassify and buffer the packets received from the NR base station 230, and then may transmit the packets to the LTE base station 210 through an EPS bearer.

Further, if the IP anchor 220 receives not only the packets received from the NR base station 230 but also new packets to be transmitted to the terminal 200, it may transmit the new packets after transmitting all the packets received from the NR base station 230 to the LTE base station 210. However, this is merely exemplary, and the IP anchor 220 may transmit the packets received from the NR base station 230 and the new packets to the LTE base station 210 based on a separately configured priority.

According to an embodiment, the IP anchor 220 may separately manage a buffer for the packets received and forwarded from the NR base station 230 and a buffer for the new packets. Further, the respective buffers of the IP anchor 220 may transmit the packets to a buffer for the forwarded packets of the LTE base station 210 and a buffer for the new packet, respectively. Further, if the LTE base station 210 receiving the packets includes a single buffer although the IP anchor 220 separately manages the respective buffers, the respective buffers of the IP anchor 220 may transmit the packets to the buffer of the LTE base station 210 sequentially or based on the priority.

Figure 3:
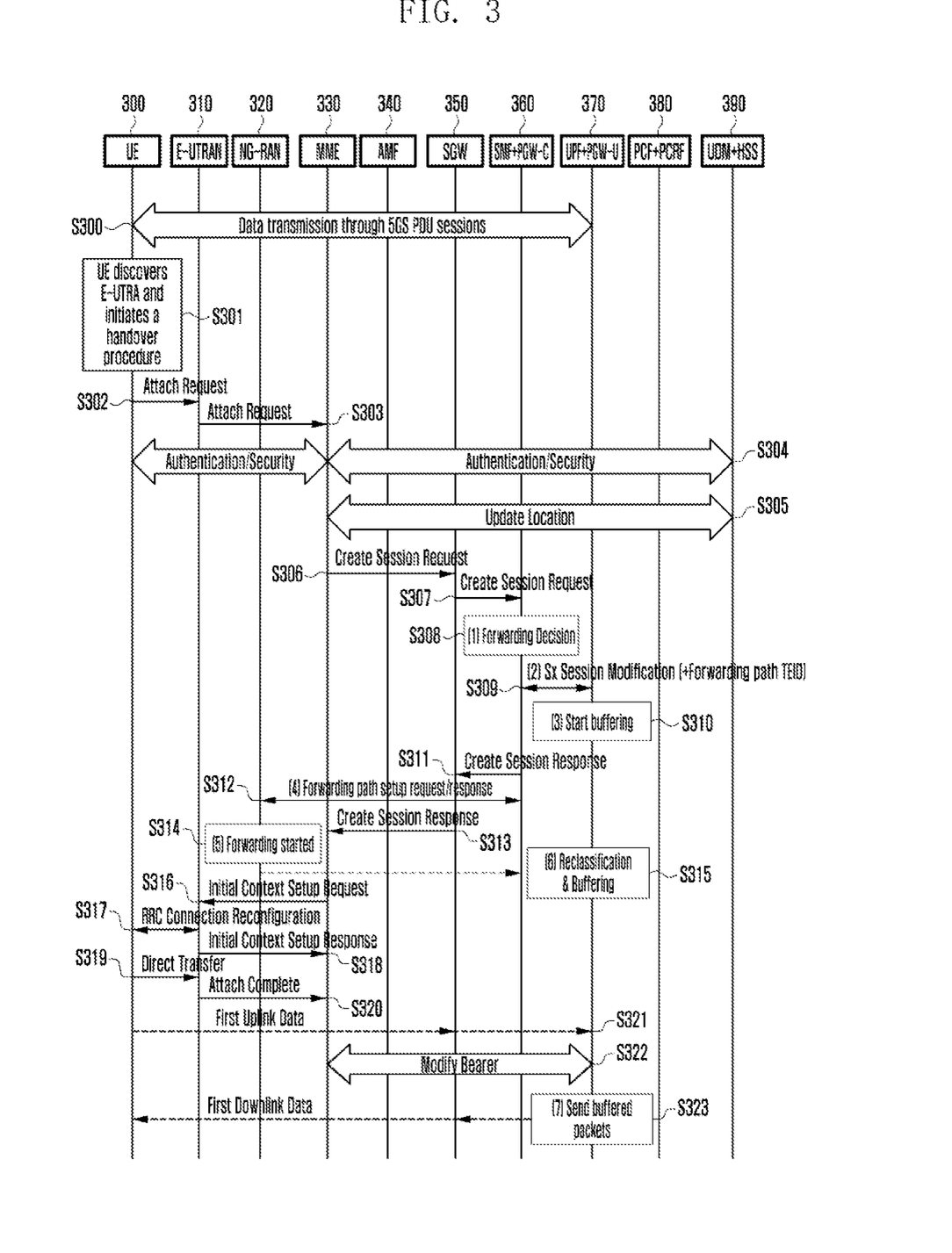
FIG. 3 is an exemplary sequence diagram illustrating an operation scheme of the present disclosure when a terminal moves from a 5G network to a 4G network according to an embodiment of the present disclosure.

Based on the above-described contents, the detailed operation of constituent elements according to the present disclosure is as illustrated in FIG. 3. FIG. 3 is a diagram illustrating a data forwarding path setup operation procedure that is a process in which a terminal moves from a 5G network to a 4G network.

Based on FIG. 3, the detailed operations for data forwarding in case where a terminal moves from a 5G network to a 4G network will be described as follows.

(1) After an MME 330 receives an attach request of a terminal 300, it may transfer a session creation request for data transmission to SMF+PGW-C 360. The SMF+PGW-C 360 may select QoS flows to which data synchronization is to be applied based on 5G session information stored therein, and include an indicator for requesting forwarding path setup in the unit of a PDU session, for data synchronization with respect to the corresponding QoS flow, in an Sx session modification message to be transferred to UPF+PGW-U 370.

According to an embodiment, the terminal 300 may perform wireless communication in the 5G network. For example, at operation S300, the terminal 300 may transmit and receive data through UPF+PGW-U 370 and PDU sessions.

At operation S301, the terminal 300 may discover an evolved universal terrestrial radio access network (E-UTRAN) 310 that is a 4G base station, and may determine a handover procedure. For example, through a movement of the terminal 300, the terminal 300 may release an attach to the 5G network, and may determine a handover to the E-UTRAN 310. At operation S302, the terminal 300 may transmit an attach request to the E-UTRAN 310. At operation S303, the E-UTRAN 310 may transmit the attach request to the MME 330.

At operation S304, an authentication/security procedure between the terminal 300 and the MME 330 and an authentication/security procedure between the MME 330 and UDM+HSS 390 may be performed. Further, at operation S305, location update between the MME 330 and the UDM+HSS 390 may be performed.

At operation S306, the MME 330 having received the attach request may transmit a session creation request to an SGW 350. Further, at operation S307, the SGW 350 may transmit the session creation request to SMF+PGW-C 360. At operation S308, the SMF+PGW-C 360 may determine data forwarding based on 5G session information.

(2) UPF+PGW-C 370 allocates forwarding path resources (forwarding path TEIDs) for data synchronization with respect to the QoS flows requested from the SNF+PGW-C 360 in the unit of a PDU session, and then includes corresponding information in a response message to be transmitted to the SMF+PGW-C 360.

For example, at operation S309, the SMF+PGW-C 360 may transfer a message including an indicator for requesting forwarding path setup in the unit of a PDU session to UPF+PGW-U 370. For example, the SMF+PGW-C 360 may select QoS flows to which data synchronization is to be applied based on the pre-stored 5G session information, and include an indicator for requesting forwarding path setup in the unit of a PDU session, for data synchronization with respect to the corresponding QoS flow, in an Sx session modification message to be transmitted to the UPF+PGW-U 370. Further, the UPF+PGW-U 370 may transmit a response message to the SMF+PGW-C 360.

(3) After performing the Sx session modification procedure, the UPF+PGW-C 360 interrupts packet transfer to the 5G base station, and stores packets newly received from an external network in buffers for QoS flows (or stores packets in buffers for 5G QoS flows depending on implementations). For example, at operation S310, the UPF+PGW-U 370 may start buffering.

According to another embodiment of the present disclosure, it is also possible for the UPF+PGW-U 370 to continuously transfer the received packets to the NG-RAN 320 that is a 5G base station, instead of performing the buffering, until the setup of the data forwarding path with the E-UTRAN 310 that is a 4G base station is completed (in this case, the amount of data packets to be transferred from the NG-RAN 320 to the E-UTRAN 310 through the forwarding path is increased).

(4) The SMF+PGW-C 360 transfers the forwarding path setup request message including the forward path TEID information transferred from the UPF_PGW-U 370 to an NG-RAN 320 that is the 5G base station, and the NR-RAN 320 determines whether to accept the data synchronization request with respect to the requested QoS flow list, and transfers the result of the determination to the SMF+PGW-C 360. The SMF+PGW-C 360 reports the corresponding information to the UPF+PGW-U 370. For example, at operation S311, the SMF+PGW-C 360 may transmit a session creation response to the SGW 350. Further, at operation S312, the SMF+PGW-C 360 may transfer the forwarding path setup request message to the NG-RAN 320. The 5G base station may transfer a response message to the forwarding path setup request message to the SMF+PGW-C 360.

(5) The NG-RAN 320 transmits the packets of the corresponding terminal 300, which remain without being transmitted, to the corresponding address of the UPF+PGW-U 370 through forwarding paths for PDU sessions mapped to the QoS flows using the forwarding path TEID information transferred from the SMF+PGW-U 370. The NG-RAN 320 transfers to the UPF+PGW-U 370 a separate packet for notifying that the final packet has been transferred in the process of transferring the last remaining packet.

For example, at operation S313, the SGW 350 having received the session creation response may transfer the session creation response to the MME 330. Further, at operation S314, the NG-RAN 320 may determine whether to forward the remaining packets that have not been transmitted to the terminal 300. If the data forwarding is determined, the NG-RAN 320 may forward the remaining non-transmitted packets to the UPF+PGW-U 370. In this case, if the remaining non-transmitted packets are transmitted in all, the NG-RAN 320 may transfer even the final packet for notifying that all the remaining packets have been forwarded to the UPF+PGW-U 370.

(6) The UPF+PGW-U 370 reclassifies the packets received from the NG-RAN 320 through the forwarding paths for the data synchronization for bearers of the 4G network, and stores the reclassified packets in buffers for bearers. If a separate packet notifying that the final packet has been transferred is transferred from the NG-RAN 320, the UPF+PGW-U 370 may release the forwarding paths set for the data synchronization, and may selectively release the forwarding paths after a predetermined time depending on implementations.

Depending on the implementations, the separate packet may be stored in a separate buffer together with newly received packets, or may be stored using the same buffer as that newly received. This is unrelated to the basic principle of the present disclosure.

For example, at operation S315, the UPF+PGW-U 370 may perform reclassification and buffering. The UPF+PGW-U 370 may receive the packets from the NG-RAN 320 through forwarding paths for the QoS flows. The UPF+PGW-U 370 may reclassify the received packets for bearers of the 4G network. Further, the UPF+PGW-U 370 may map the reclassified packets for bearers to transmit the packets in the unit of a bearer with respect to the e-UTRAN 310.

(7) If the terminal 300 completes the path setup with the E-UTRAN 310 and the setup of the data forwarding paths of the 4G network is completed, the UPF+PGW-U 370 transfers the packets transferred from the NG-RAN 320 and stored in the buffers for the data synchronization to the terminal 300 through the E-UTRAN 310. If forwarding of the packets stored in the synchronization buffers is completed, forwarding of the packets stored in the buffers in which the newly transferred packets are stored starts.

For example, in order for the terminal 300 to complete the path setup with the E-UTRAN 310, at operation S316, the MME 330 may transmit an initial context configuration request to the E-UTRAN 310. Further, at operation S317, the terminal 300 and the E-UTRAN 310 may perform RRC connection reconfiguration. Further, at operation S319, the terminal 300 may transmit a direct transfer to the E-UTRAN 310. At operation S321, the terminal 300 may transmit initial uplink data to the UPF+PGW-U 370 through the SGW 350. Further, at operation S322, the MME 330 and the UPF+PGW-U 370 may correct the bearer. At operation S323, the UPF+PGW-U 370 may forward the packets transferred from the NG-RAN 320 and buffered to the terminal 300.

Figure 4:
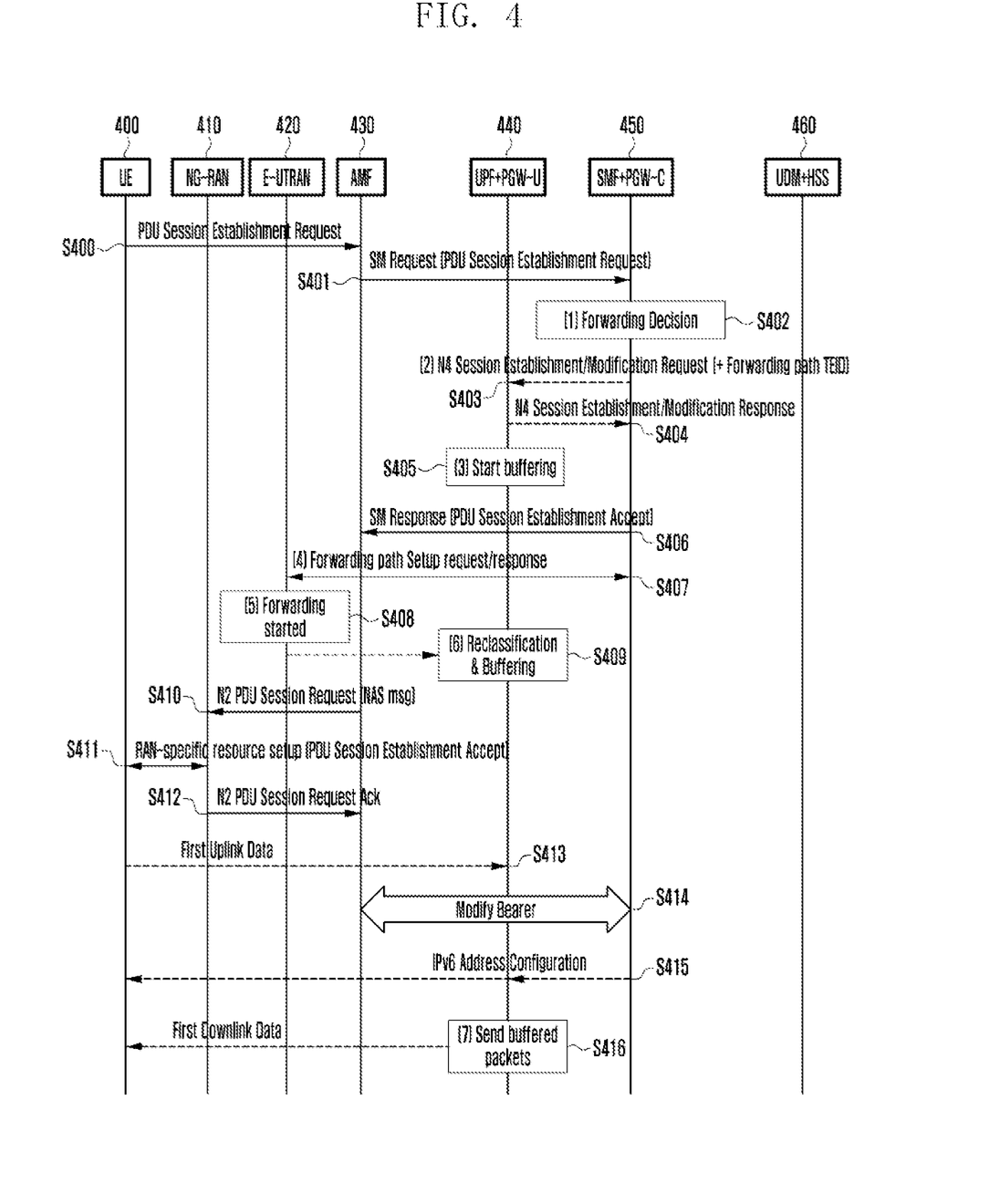
FIG. 4 is an exemplary sequence diagram illustrating an operation scheme of the present disclosure when a terminal moves from a 4G network to a 5G network according to an embodiment of the present disclosure.

According to another embodiment of the present disclosure, FIG. 4 is a diagram illustrating a data forwarding path setup operation procedure. For example, FIG. 4 is a diagram illustrating a process during a movement from a 4G network to a 5G network.

Based on FIG. 4, the detailed operation for data forwarding in case where a terminal moves from a 4G network to a 5G network will be described as follows.

(1) If a session creation request for data transmission is transferred to SMF+PGW-C 450 after an AMF 430 receives an attach request of a terminal 400, the SMF+PGW-C 450 selects 4G EPS bearers to which data synchronization is to be applied based on 4G session information stored therein, includes an indicator for requesting forwarding path setup in the unit of a 4G EPS bearer, for data synchronization with respect to the corresponding EPS bearer, in an N4 session establishment/modification request message, and transfers the message to UPF+PGW-U 440.

According to an embodiment, the terminal 400, which accesses an evolved universal terrestrial radio access network (E-UTRAN) 420 and performs wireless communication in the 4G network, may discover an NR-RAN 410, and may perform a handover. For example, through movement of the terminal 400, the terminal 400 may release an attach to the 4G network, and may determine a handover to the NR-RAN 410. For the handover to the 5G network, the terminal 400, at operation S400, may transmit a PDU session establishment request to the AMF 430.

At operation S401, the AMF 430 may transfer the received PDU session establishment request to the SMF+PGW-C 450. Further, at operation S402, the SMF+PGW-C 450 may determine whether to perform data forwarding based on stored 4G session information. Further, at operation S403, the SMF+PGW-C 450 may transmit to UPF+PGW-U 440 a message including an indicator for requesting setup of a forwarding path in the unit of a 4G EPS bearer.

(2) The UPF+PGW-U 440 allocates forwarding path resources (forwarding path TEIDs) for data synchronization with respect to the 4G EPS bearers requested from the SMF+PGW-C 450 in the unit of a 4G EPS bearer, includes corresponding allocation information in a response message, and transfers the response message to the SMF PGW-C 450. For example, at operation S404, the UPF+PGW-U 440 may transmit the response message to the SMF+PGW-C 450.

(3) After performing the N4 session establishment/modification procedure, the UPF+PGW-U 440 interrupts packet transfer to the E-UTRAN 420, and stores packets newly received from an external network in buffers for 4G EPS bearers (or in buffers for 5G QoS flows depending on implementations). For example, at operation S405, the UPF+PGW-U 440 may start buffering.

According to another embodiment of the present disclosure, it is also possible for the UPF+PGW-U 440 to continuously transfer the received packets to the E-UTRAN 420 that is a 4G base station, instead of performing the buffering, until the setup of the data forwarding path with the NR-RAN 410 that is a 5G base station is completed (in this case, the amount of data packets to be transferred from the 4G base station to the 5G base station through the forwarding path is increased).

(4) The SMF+PGW-C 450 transfers the forwarding path setup request message including the forward path TEID information transferred from the UPF+PGW-U 440 to the E-UTRAN 420, and the E-UTRAN 420 determines whether to accept the data synchronization request with respect to the requested EPS bearer, and transfers the result of the determination to the SMF+PGW-C 450. The SMF+PGW-C 450 reports the corresponding information to the UPF+PGW-C 440. For example, at operation S406, the SMF+PGW-C 450 may transmit a PDU session establishment accept response to the AMF 430. Further, at operation S407, the SMF+PGW-C 450 may transfer the forwarding path setup request message to the E-UTRAN 420. The E-UTRAN 420 may transfer a response message to the forward path setup request message to the SMF+PGW-C 450.

(5) The E-UTRAN 420 transmits the remaining non-transmitted packets of the corresponding terminal to the corresponding address of the UPF+PGW-U 440 using the forwarding path TED information configured in the unit of a 4G EPS bearer and transferred from the SMF+PGW-C 450. The E-UTRAN 420 transfers to the UPF+PGW-U 440 a separate packet for notifying that the final packet has been transferred in the process of transferring the last remaining packet.

For example, at operation S408, the E-UTRAN 420 may determine whether to forward the remaining non-transmitted packets to the terminal 400. If the data forwarding is determined, the E-UTRAN 420 may forward the remaining non-transmitted packets to the UPF+PGW-U 440. In this case, if the remaining non-transmitted packets are transmitted in all, the E-UTRAN 420 may transfer even the final packet for notifying that all the remaining packets have been forwarded to the UPF+PGW-U 440.

(6) The UPF+PGW-U 440 reclassifies the packets received from the E-UTRAN 420 through the forwarding paths for the data synchronization for QoS flows of the 5G network, and stores the reclassified packets in buffers for QoS flows (or depending on implementations, buffers for PDU sessions can be used). If a separate packet notifying that the final packet has been transferred is transferred from the E-UTRAN 420, the UPF+PGW-U 440 may release the forwarding paths set for the data synchronization, and may selectively release the forwarding paths after a predetermined time depending on implementations.

Depending on the implementations, the separate packet may be stored in a separate buffer together with newly received packets, or may be stored using the same buffer as that newly received. This is unrelated to the basic principle of the present disclosure.

For example, at operation S409, the UPF+PGW-U 440 may perform reclassification and buffering. The UPF+PGW-U 440 may receive the packets from the E-UTRAN 420 through forwarding paths for the 4G EPS bearers. The UPF+PGW-U 440 may reclassify the received packets for QoS flows of the 5G network. Further, the UPF+PGW-U 440 may map the reclassified packets for QoS flows to transmit the packets in the unit of a QoS flow with respect to the NG-RAN 410.

(7) If the terminal 400 completes the path setup with the NG-RAN 410 and the setup of the data forwarding paths of the 5G network is completed, the UPF+PGW-U 440 transfers the packets transferred from the E-UTRAN 420 and stored in the buffers for the data synchronization to the terminal through the NG-RAN 410. If forwarding of the packets stored in the synchronization buffers is completed, forwarding of the packets stored in the buffers in which the newly transferred packets are stored starts.

For example, at operation S410, the AMF 430 may transmit an N2 PDU session request to the NG-RAN 410. At operation S411, the terminal 400 and the NG-RAN 410 may configure RAN-specific resources. At operation S412, the NG-RAN 410 may transmit an ack message for the N2 PDU session request to the AMF 430. At operation S413, the terminal 400 having accessed the 5G network may transmit initial uplink data to the UPF+PGW-U 440. If the bearer between the AMF 430 and the SMF+PGW-C 450 is corrected at operation S 414, the SMF+PGW-C 450, at operation S415, may transmit an IP v6 address configuration to the terminal 400 through the UPF+PGW-U 440. Further, at operation S416, the UPF+PGW-U 440 may forward the packets transferred from the E-UTRAN 420 and buffered to the terminal 400.

According to embodiments of the present disclosure, in relation to an apparatus and an operation for providing data synchronization during movement between a 4G network and a 5G network for a 4G/5G dual-registered mobile communication terminal, the present disclosure discloses determining, by a node taking charge of an anchor (PGW-C+SMF), QoS flows for data synchronization in a data signaling forwarding path, configuring a path for transferring remaining data packets between base stations, reclassifying and buffering, by a node taking charge of an anchor (PGW-U+UPF), the data packets transferred from a source base station in the IP packet forwarding path before transferring the data packets to a target base station, transferring, by the node taking charge of the anchor (PGW-U+UPF), the buffered packets to a new base station in the IP packet forwarding path, and determining a time to release the forwarding path for data transfer and releasing the forwarding path.

According to the present disclosure as described above, it is possible to transfer the remaining data between different base stations in the dual-registration interworking process, and thus it becomes possible to provide the terminal mobility between the 4G and 5G networks without the data loss.

Further, it becomes possible to provide the terminal mobility with no data loss without changing the 5G and 4G base station implementation through addition of a simple function of new equipment, such as SMF and UPF.

Further, it becomes possible to support different QoS and forwarding path units in the 5G and 4G networks without changing the 5G and 4G base station functions.

Further, it becomes possible to exempt additional function implementation costs for re-ordering in the terminal and the network through in-order delivery of the packets to the terminal without changing the packet order during the 4G-5G network movement.

Figure 5:
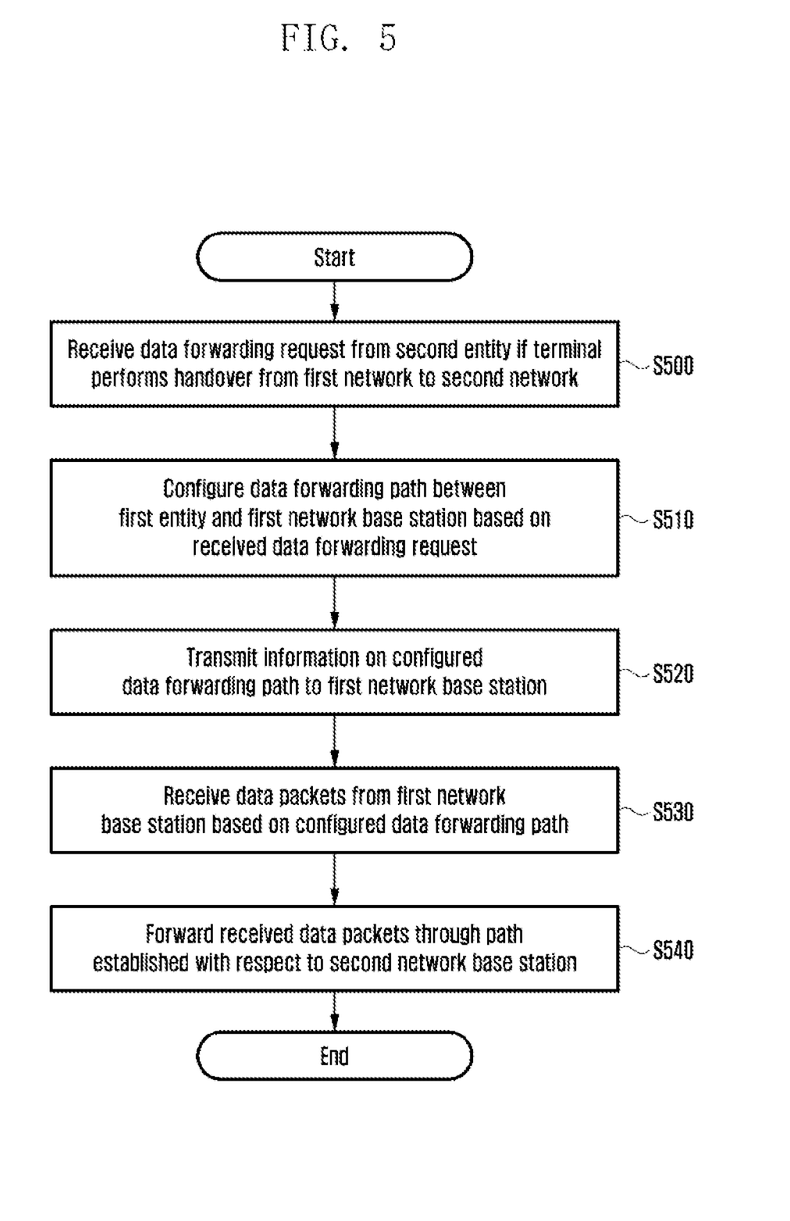
FIG. 5 is an exemplary flowchart illustrating a method for controlling a first entity according to an embodiment of the present disclosure.

FIG. 5 is a flowchart illustrating a method for controlling a first entity according to an embodiment of the present disclosure.

First, at operation S500, in case of a handover from a first network to a second network, a first entity may receive a data forwarding request from a second entity. The first entity may be an entity that processes user data packets, and the second entity may be an entity that processes control signals. For example, the first entity may be UPF+PGW-U entity, and the second entity may be SMF+PGW-C entity.

At operation S510, based on the received data forwarding request, the first entity may configure a data forwarding path between the first entity and a first network base station.

At operation S520, the first entity may transmit information on the configured data forwarding path to the first network base station. In case where the terminal performs a handover from the 5G network to the 4G network, the first network base station may be a 5G base station. In contrast, in case where the terminal performs a handover from the 4G network to the 5G network, the first network base station may be a 4G base station.

At operation S530, based on the configured data forwarding path, the first entity may receive data packets from the first network base station. For example, if the first network base station is the 5G base station, through the handover of the terminal, the 5G base station may transmit the remaining packets that have not been transmitted to the terminal to forwarding paths for PDU sessions mapped to QoS flows. Further, if the remaining non-transmitted packets are transmitted in all, the 5G base station may transmit the final packet indicating that all the data packets have been transmitted to the first entity. On the other hand, if the first network base station is the 4G base station, through the handover of the terminal, the 4G base station may transmit the remaining packets that have not been transmitted to the terminal to forwarding paths established in the unit of a 4G EPS bearer. Further, if the remaining non-transmitted packets are transmitted in all, the 4G base station may transmit the final packet indicating that all the data packets have been transmitted to the first entity.

If the final packet is received, the first entity may release the data forwarding path configured between the first entity and the first network base station.

At operation S540, the first entity may forward the received data packets through a path established with respect to a second network base station.

The first entity may perform buffering of the data packets received from the first network base station. For example, the first entity may store the data packets received from the first network base station in a first buffer, and may store new data packets in a second buffer. Further, the first entity may transmit the data packets stored in the first buffer to the second network base station, and if transmission of the data packets stored in the first buffer is completed, the first entity may transmit the data packets stored in the second buffer to the second network base station. However, this is merely exemplary, and the first entity may transmit the data packets stored in the first buffer and the second buffer to the second network base station based on a predetermined priority.

Further, the first entity may reclassify the received data packets, and may map the reclassified data packets based on the path established with respect to the second network base station. The reclassification may reclassify the received data packets for bearers if the second network base station is the 4G base station, and may reclassify the received data packets for QoS flows if the second network base station is the 5G base station.

Figure 6:
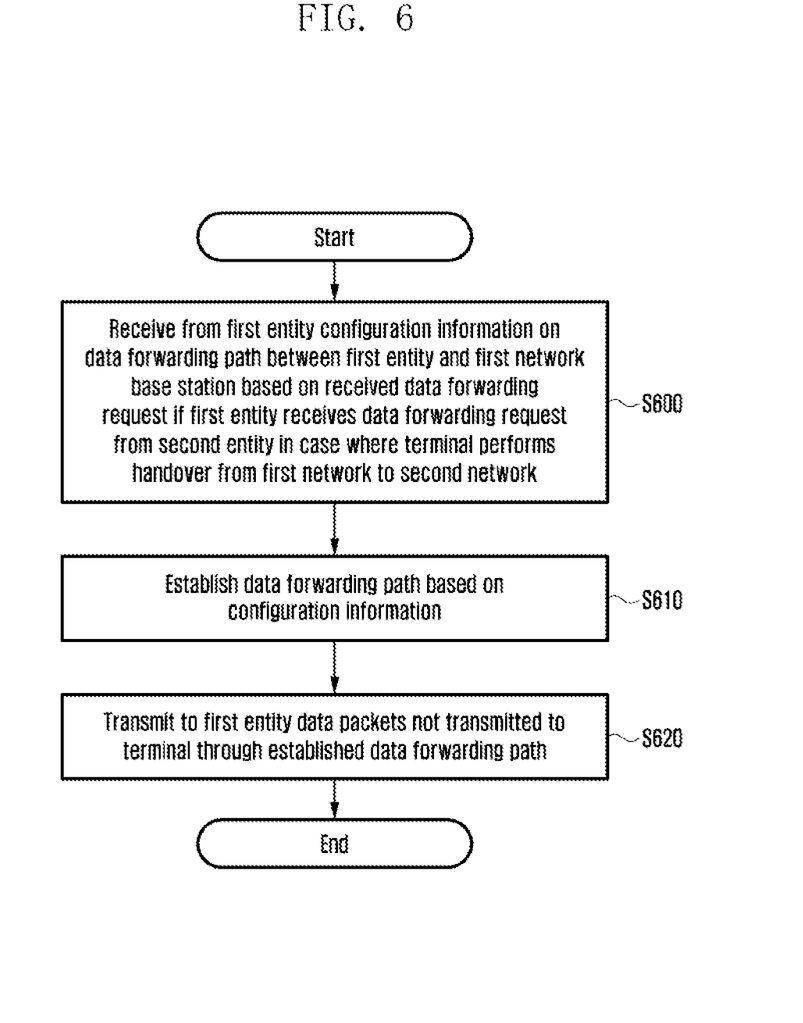
FIG. 6 is an exemplary flowchart illustrating a method for controlling a first network base station according to an embodiment of the present disclosure.

On the other hand, FIG. 6 is a flowchart illustrating a method for controlling a first network base station according to an embodiment of the present disclosure.

At operation S600, if a first entity receives a data forwarding request from a second entity in case where a terminal performs a handover from a first network to a second network, a first network base station may receive configuration information on a data forwarding path between the first entity and the first network base station from the first entity based on the received data forwarding request. The first entity may be an entity that processes user data packets, and the second entity may be an entity that processes control signals. For example, the first entity may be UPF+PGW-U entity, and the second entity may be SMF+PGW-C entity.

At operation S610, based on the configuration information, the first network base station may establish the data forwarding path. For example, the first network base station may establish the data forwarding path between the first entity and a first network base station.

At operation S620, the first network base station may transmit the data packets that are not transmitted to the terminal to the first entity through the established data forwarding path. As the terminal performs a handover from the first network to the second network, the first network base station may transmit the data packets that are not transmitted to the terminal to the first entity through the established data forwarding path.

The data packets may be forwarded through the path established with respect to a second network base station by the first entity.

If the data packets stored in the first network base station are transmitted in all, the first network base station may transmit the final packet indicating that all the stored data packets have been transmitted to the first entity. Further, if the final packet is transmitted to the first entity, the data forwarding path configured between the first entity and the first network base station may be released by the first entity.

According to an embodiment of the present disclosure, a first entity may receive a data forwarding request from a second entity through a movement of a terminal from a first network to a second network, configure a data forwarding path between the first entity and a first network base station based on the received data forwarding request and transmit information on the configured data forwarding path to the first network base station, receive data packets from the first network base station based on the configured data forwarding path, and forward the received data packets through a path established with respect to a second network base station.

The first entity may be configured to buffer the data packets received from the first network base station.

The first entity may be configured to reclassify the received data packets for bearers if the second network base station is a 4G base station, reclassify the received data packets for QoS flows if the second network base station is a 5G base station, and map the reclassified data packets based on a path established with respect to the second network base station.

The first entity may be configured to store the data packets received from the first network base station and new data packets in different buffers.

The first entity may be configured to transmit the data packets received from the first network base station and stored to the second network base station, and transmit the new stored data packets to the second network base station if the forwarding is completed.

The first entity may be configured to receive a final packet indicating that all the stored data packets have been transmitted from the first network base station.

The first entity may be configured to release the data forwarding path configured between the first entity and the first network base station if the final packet is received.

The first entity may be an entity processing user data packets, and the second entity may be an entity processing control signals.

According to another embodiment of the present disclosure, a first network base station may be configured to receive, if a first entity receives a data forwarding request from a second entity through movement of a terminal from a first network to a second network, configuration information on a data forwarding path between the first entity and the first network base station from the first entity based on the received data forwarding request, establish the data forwarding path based on the configuration information, and transmit data packets that have not been transmitted to the terminal to the first entity through the established data forwarding path, wherein the data packets are forwarded by the first entity through a path established with respect to a second network base station.

The first network base station may be configured to transmit a final packet indicating that all the stored data packets have been transmitted to the first entity and release the data forwarding path configured between the first entity and the first network base station if all the data packets stored in the first network base station have been transmitted.

The first entity may be an entity processing user data packets, and the second entity may be an entity processing control signals.

In the embodiments of the present disclosure as described above, constituent elements included in the present disclosure are expressed in a singular form or in a plural form. However, such a singular or plural expression is selected to suit a situation presented for convenience in explanation, and thus the present disclosure is not limited to such singular or plural constituent elements. Even plural constituent elements may be expressed in a singular form, and even a single constituent element may be expressed in a plural form.

Although detailed embodiments of the present disclosure have been described in the specification and drawings, it will be apparent that various modifications are possible within the scope of the present disclosure. Accordingly, the scope of the present disclosure should not be limited to the embodiments as described above, but should be defined by the appended claims below and those equivalent to the scope of the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a packet data network gateway-control plane+session management function (PGW-C+SMF) in a mobile communication system, the method comprising:
   transmitting, to a packet data network gateway-user plane+user plane function (PGW-U+UPF), a request message including first information for allocating a tunnel for data forwarding to the PGW-U+UPF, in case that a terminal is handed over from a 5th generation system (5GS) to a second network system an evolved packet system (EPS);
   as a response to the request message, receiving, from the PGW-U+UPF, a response message including second information on the tunnel for the data forwarding to the PGW-U+UPF; and
   transmitting, to a first base station associated with the 5GS, the second information,
   wherein the first information includes a quality of service (QoS) flow identifier for the data forwarding to the PGW-U+UPF,
   wherein a QoS flow corresponding to the QoS flow identifier is mapped into a data forwarding tunnel associated with the EPS,
   wherein the second information is used to forward at least one data packet from the first base station to a second base station associated with the EPS through the PGW-U+UPF, and
   wherein the second information includes a tunnel endpoint identifier (TEID) for a protocol data unit (PDU) session for the data forwarding to the PGW-U+UPF.

2. The method of claim 1, further comprising receiving, from an access and mobility management function (AMF), a session request message related to the data forwarding.

3. The method of claim 1, wherein the at least one data packet is forwarded from the first base station to the second base station through the PGW-U+UPF based on mapping between the QoS flow and the data forwarding tunnel.

4. A packet data network gateway-control plane+session management function (PGW-C+SMF) in a mobile communication system, the PGW-C+SMF comprising at least one module configured to:
- transmit, to a packet data network gateway-user plane+ user plane function (PGW-U+UPF), a request message including first information for allocating a tunnel for data forwarding to the PGW-U+UPF, in case that a terminal is handed over from a 5th generation system (5GS) to an evolved packet system (EPS),
- as a response to the request message, receive, from the PGW-U+UPF, a response message including second information on the tunnel for the data forwarding to the PGW-U+UPF, and
- transmit, to a first base station associated with the 5GS, the second information,
- wherein the first information includes a quality of service (QoS) flow identifier for the data forwarding to the PGW-U+UPF,
- wherein a QoS flow corresponding to the QoS flow identifier is mapped into a data forwarding tunnel associated with the EPS,
- wherein the second information is used to forward at least one data packet from the first base station to a second base station associated with the EPS through the PGW-U+UPF, and
- wherein the second information includes a tunnel endpoint identifier (TEID) for a protocol data unit (PDU) session for the data forwarding to the PGW-U+UPF.

5. The PGW-C+SMF of claim 4, wherein the at least one module is further configured to receive, from an access and mobility management function (AMF), a session request message related to the data forwarding.

6. The PGW-C+SMF of claim 4, wherein the at least one data packet is forwarded from the first base station to the second base station through the PGW-U+UPF based on mapping between the QoS flow and the data forwarding tunnel.

\* \* \* \* \*